J. B. SEAVERNS.
UNLOADING APPARATUS.
APPLICATION FILED MAR. 10, 1914. RENEWED MAY 12, 1917.
1,242,249.
Patented Oct. 9, 1917.
3 SHEETS—SHEET 2.
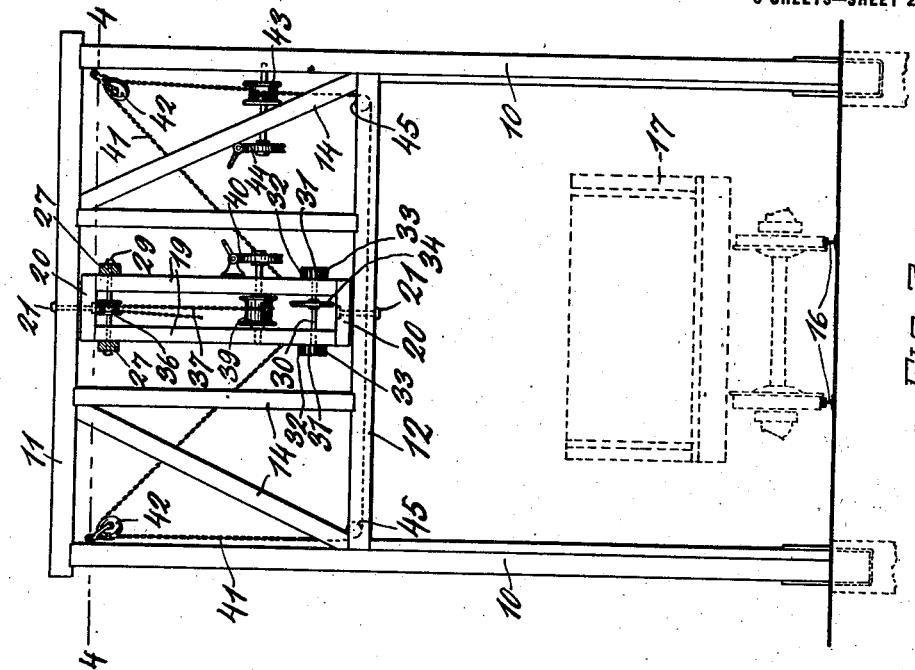
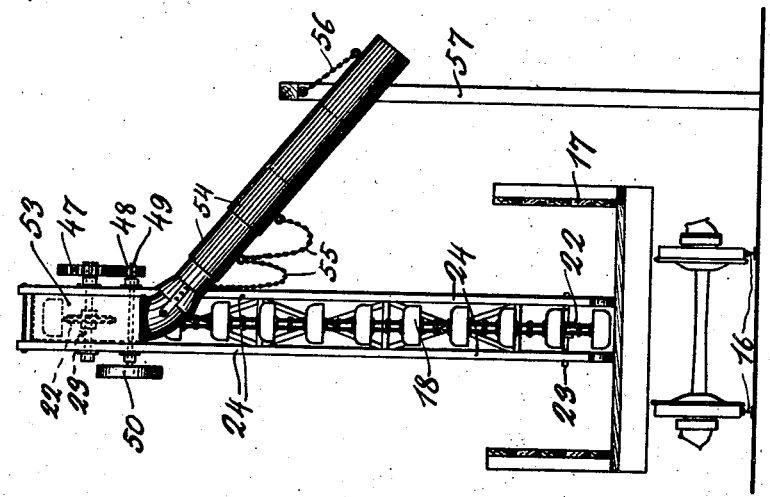
WITNESSES:
James B. Seaverns,
INVENTOR.
BY
ATTORNEYS.

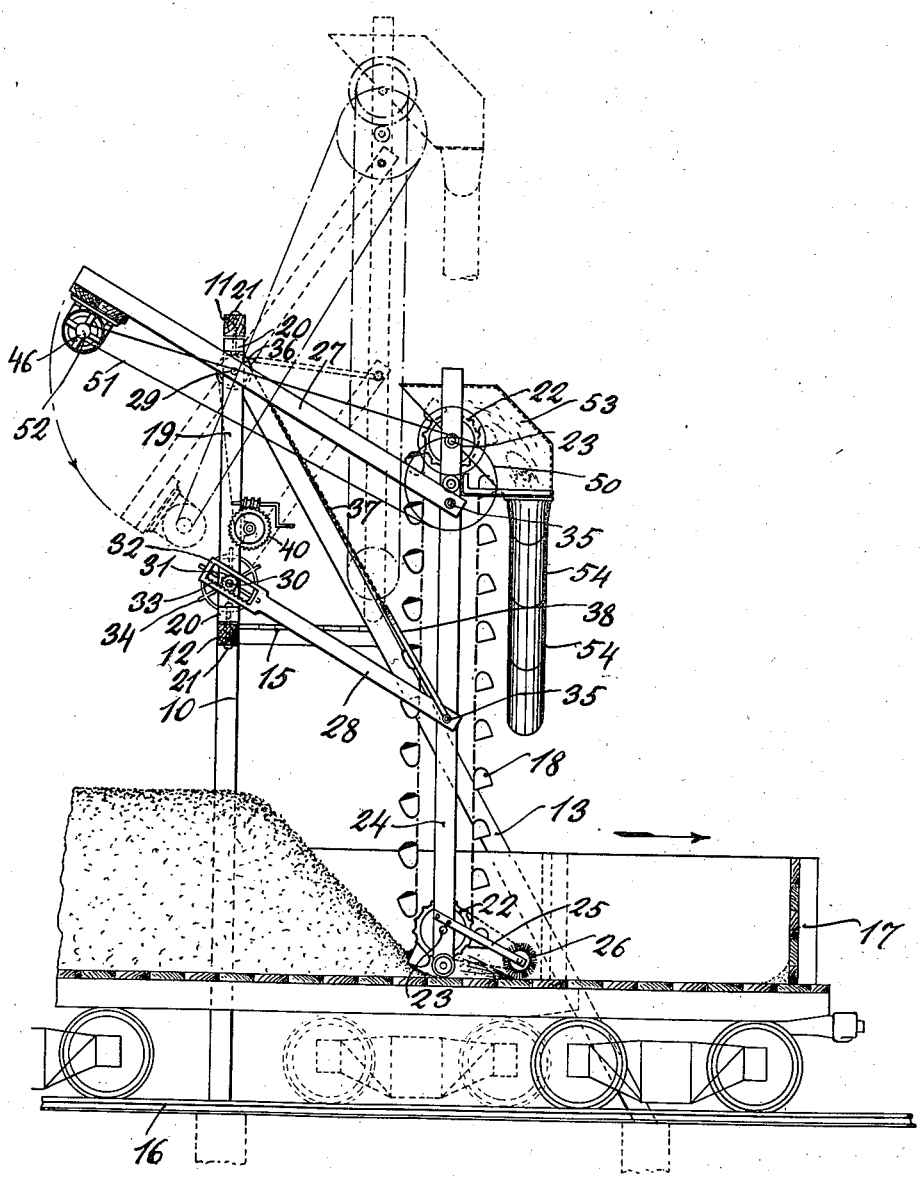

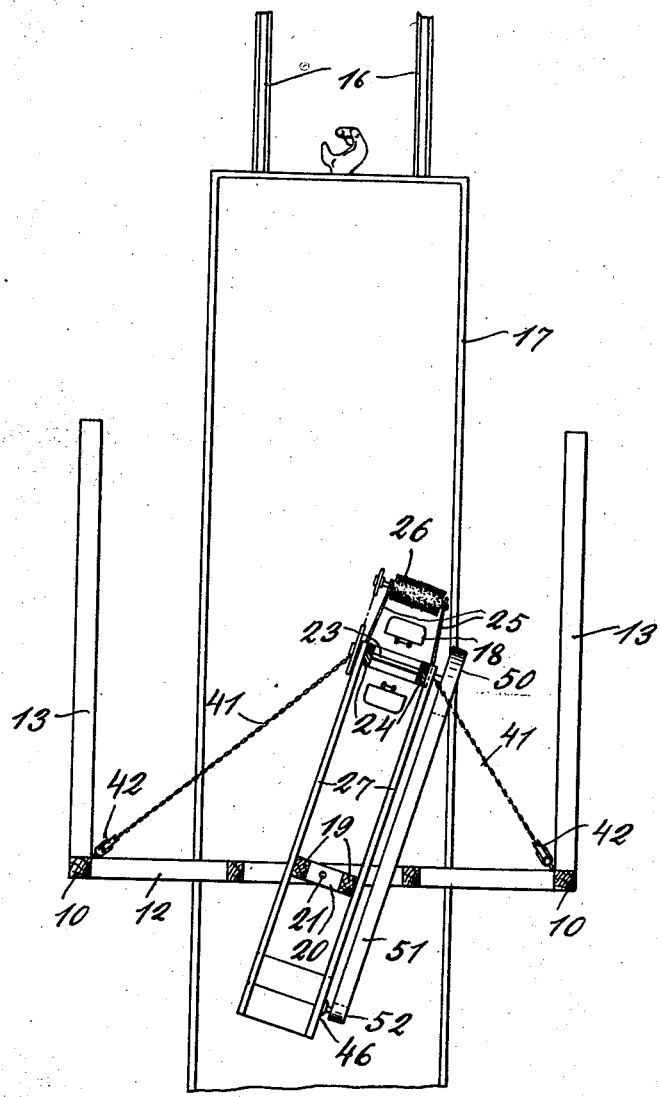
- FIG. 4 -

UNITED STATES PATENT OFFICE.

JAMES B. SEAVERNS, OF CHICAGO, ILLINOIS.

UNLOADING APPARATUS.

1,242,249. Specification of Letters Patent. Patented Oct. 9, 1917.

Application filed March 10, 1914, Serial No. 823,707. Renewed May 12, 1917. Serial No. 168,312.

*To all whom it may concern:*

Be it known that I, JAMES B. SEAVERNS, a citizen of the United States, residing at Chicago, in the county of Cook and State of Illinois, have invented certain new and useful Improvements in Unloading Apparatus, of which the following is a specification.

This invention relates to apparatus for unloading coal or other material, and its object is to provide an apparatus of this kind which can be easily controlled, and which is rapid in operation. An endless bucket conveyer is provided having novel means for adjusting the same to the mass of material to be unloaded.

In order that the invention may be better understood, reference is had to the accompanying drawings, in which—

Figure 1 is an elevation of the apparatus, partly in section;

Fig. 2 is a front elevation showing the supporting frame of the conveyer, the latter being removed;

Fig. 3 is a front elevation of the conveyer, and

Fig. 4 is a horizontal section on the line 4—4 of Fig. 2, the conveyer being removed.

Referring specifically to the drawings, the supporting frame of the apparatus comprises a pair of posts 10, connected at the top by a cross-beam 11, and below the latter by a cross-beam 12. The posts are braced by inclined posts 13, and between the beams 11 and 12 extend braces 14. This frame work carries a platform 15 for the operator to stand on, said platform being at the same elevation as the cross-beam 12. The frame straddles a track 16 on which run the cars 17 to be unloaded.

Between the beams 11 and 12 is rotatably mounted a supporting frame for an endless bucket conveyer 18. This frame comprises spaced side members 19 having top and bottom connecting parts 20, through which latter and the beams 11 and 12, pass pivots 21 by which the frame is mounted to swing or rotate in a horizontal plane.

The conveyer 18 comprises an endless chain passing over top and bottom sprocket wheels 22 and carrying buckets. The sprocket wheel shafts 23 are supported by a frame composed of bars 24, suitably braced and connected in laterally spaced relation. From the lower ends of the bars extends a frame 25 carrying a rotary brush 26 located behind the conveyer for sweeping the material toward the receiving end, as shown in Fig. 1. The brush is geared to the bottom sprocket wheel 22.

The conveyer 18 is hung from the rotatable supporting frame by means of upper and lower, parallel arms 27 and 28, respectively. The arms 27 are pivotally mounted on a transverse shaft 29 carried by the frame members 19. Below this shaft the frame members carry a transverse shaft 30 having pinions 31 which work in yokes 32 at the inner ends of the arms 28, said yokes having racks 33 on one side in mesh with the pinions. On the shaft 30 is a hand-wheel 34 for operating the same. The outer ends of the arms are pivotally connected to the side bars 24 of the conveyer frame, as indicated at 35.

By pivoting the arms 27 and 28 as hereinbefore described they may be swung in a vertical plane to raise or lower the conveyer, the following means being provided for this purpose:

The top 20 of the rotary conveyer supporting frame carries a sheave 36 over which is trained a chain, cable or other flexible connection or hauling line 37, one end of which is connected to a bail 38, which latter is connected to the outer end of the arms 28. The other end of the line is wound on a drum 39 carried by the frame members 19 and provided with a manually operated worm drive gear 40. Upon winding the line on the drum the conveyer may be elevated as shown dotted in Fig. 1.

The following means are provided for swinging the conveyer 18 horizontally in the arc of a circle:

To the conveyer side bars 24 are connected hauling chains, cables or lines 41 which extend outward in opposite directions, as shown in Fig. 4, and upward to sheaves 42 carried by the posts 10 at the top thereof. From the sheaves, the lines pass to a drum 43 having a suitable manually operated worm drive gear 44. Suitable guide-sheaves 45 are provided for one of the lines. The lines are wound in opposite directions on the drum, so that when one of them is wound on the drum, the other one is paid out.

In operation, the conveyer 18 is lowered into the car 17, and started. The car is moved forward in the direction of the arrow shown in Fig. 1 at intervals to keep the conveyer at the mass of material. However, as it is not convenient to move the car at frequent intervals, the conveyer may be moved forward to follow the material. This is done by operating the hand-wheel 34, whereby, through the pinion 31 and racks 33, the arms 28 are moved in the direction of their length and the conveyer is advanced. Upon operating the hand-wheel in a reverse direction the conveyer may be backed. The lower arms 28 hold the conveyer to the work and prevent the same from swinging back from the material.

The brush 26 will not hinder the unloading at the start as the conveyer 18 need not be started from the extreme end of the car 17. If the material remains at the end, the brush will throw it within reach of the conveyer buckets.

The conveyer 18 is driven by an electric or other motor 46 carried by the rear ends of the arms 27, said ends projecting rearward from the rotary frame a sufficient distance so that the motor does not interfere with their swing. The arms 27 are pivoted intermediate their ends to the rotary frame so that the motor may be mounted on the rear ends thereof, and this arrangement of the arms 27 also enables a counterweight to be mounted on the rear ends thereof to counterbalance the conveyer. On the shaft 23 of the top sprocket wheel 22 is a pinion 47 which is in mesh with a spur gear 48 on a shaft 49 carried by the side bars 24. The shaft 49 has a pulley 50 which is connected by a belt 51 to a pulley 52 on the motor shaft.

At the top of the conveyer 18 is a hopper 53 into which the conveyer discharges. The hopper has a discharge spout composed of telescoping sections 54 connected by chains 55. The outer end of the spout is supported by a chain 56 carried by a stationary post 57. By providing a telescoping spout, the latter may be lengthened or shortened, as the conveyer is raised or lowered. The apparatus may be mounted on a track in order that it can be moved along the track 16, as in some instances it may be inconvenient or unfeasible to push the car up to the conveyer every few feet.

I claim:

The combination of a support, a horizontally swinging frame carried by the support, vertically spaced parallel arms pivoted to the frame to swing in a vertical plane, the top arm being pivoted intermediate its ends to the frame, an elevator carried by the upper arm and braced by the lower arm, means for swinging the arms to raise and lower the elevator, and means for swinging the aforesaid frame in a horizontal arc from side to side.

In testimony whereof I affix my signature in presence of two witnesses.

JAMES B. SEAVERNS.

Witnesses:
   S. J. LEHRER,
   H. G. BATCHELOR.